US006739518B1

(12) United States Patent
Davis et al.

(10) Patent No.: US 6,739,518 B1
(45) Date of Patent: May 25, 2004

(54) SPRAY APPLICATOR

(75) Inventors: James Scott Davis, Galena, MD (US); Constance Meta Smith, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/685,669

(22) Filed: Oct. 10, 2000

Related U.S. Application Data

(60) Provisional application No. 60/172,928, filed on Dec. 21, 1999.

(51) Int. Cl.[7] ................................................ A01G 23/10

(52) U.S. Cl. ........................ 239/3; 239/690; 239/690.1; 118/626

(58) Field of Search ................................. 239/690–700, 239/705, 706, 3; 118/629, 621, 620, 624, 626, 628

(56) References Cited

U.S. PATENT DOCUMENTS

| | | | | | |
|---|---|---|---|---|---|
| 2,152,077 | A | * | 3/1939 | Meston et al. | 118/626 |
| 3,085,749 | A | * | 4/1963 | Schweitzer et al. | 239/700 |
| 3,411,931 | A | * | 11/1968 | Burns et al. | 118/624 |
| 4,362,275 | A | * | 12/1982 | Coffee | 239/700 |
| 4,599,294 | A | | 7/1986 | Matsumoto et al. | |
| 4,613,076 | A | * | 9/1986 | Dietz et al. | 239/703 |
| 4,621,268 | A | * | 11/1986 | Keeling et al. | 239/693 |
| 4,635,847 | A | | 1/1987 | Jackson | |
| 4,664,315 | A | * | 5/1987 | Parmentar et al. | 239/706 |
| 4,685,620 | A | | 8/1987 | Law et al. | |
| 4,726,521 | A | * | 2/1988 | Simm et al. | 239/697 |
| 4,762,274 | A | | 8/1988 | Burls et al. | |
| 4,779,805 | A | | 10/1988 | Jackson et al. | |
| 4,901,666 | A | * | 2/1990 | Nagasaka et al. | 118/634 |
| 4,980,057 | A | * | 12/1990 | Dorn et al. | 210/198.2 |
| 5,156,880 | A | * | 10/1992 | Inculet | 118/626 |
| 5,402,945 | A | | 4/1995 | Swanson, Jr. | |
| 5,564,628 | A | | 10/1996 | Hall et al. | |
| 5,882,591 | A | * | 3/1999 | Kekez | 239/3 |

FOREIGN PATENT DOCUMENTS

| | | |
|---|---|---|
| WO | WO 97/33179 | 9/1997 |

OTHER PUBLICATIONS

David Halliday and Robert Resnick, Physics, John Wiley & Sons Publisher, Third Edition, Part 2, pp. 566, 584.*

Matthews, G.A., Pesticide Application Methods, 2nd ed., Longman Scientific & Technical, 1992, Ch. 5, (Hydraulic Energy Nozzle), pp. 99–113.

G. A. Matthews, *Electrostatically Charged Spray,* Pesticide Application Methods Ch. 9 pp. 207–222.

* cited by examiner

*Primary Examiner*—Dinh Q. Nguyen

(57) ABSTRACT

An apparatus and method are disclosed for efficiently applying a test substance to a test unit by atomizing a solution or suspension of the test substance and electrostatically attracting the atomized droplets to the test unit. This apparatus and method can be used to apply small quantities of test substances to organisms such as plants or insects to assay their utility as crop protection agents.

9 Claims, 3 Drawing Sheets

SPRAY APPLICATOR

CROSS-REFERENCE TO RELATED APPLICATIONS

This application claims the benefit of Provisional Application No. 60/172,928, filed Dec. 21, 1999.

FIELD OF THE INVENTION

The present invention relates to a spray applicator and method useful for applying small quantities of a test substance to a test unit with exceptional efficiency by using a combination of ultrasonic, electrostatic and optionally gas-assist technologies. When used for spraying plants or insects, this device facilitates evaluating the herbicidal, fungicidal or insecticidal properties of a test substance in microliter volumes using only microgram quantities of the substance.

BACKGROUND OF THE INVENTION

Substances useful for the protection of plants have traditionally been discovered by screening test substances for biological activity on intact plants grown in soil in greenhouses or growth chambers. In these assays, test substances (such as chemical compounds or biological organisms) are sprayed using conventional technology (Matthews, G. A., *Pesticide Application Methods,* 2nd ed., Longman Scientific & Technical, 1992, Ch. 5 (Hydraulic Energy Nozzle), pp. 99–113) either onto test units comprising soil containing ungerminated seeds or onto test units comprising plants (crops or weeds) which may be infected with specific plant pathogens or infested with specific insect pests. The treated test units are cultured for days or weeks after which time the effectiveness of the test substance is assessed. Such bioassays have the advantage of testing the activity of substances under relatively realistic conditions of plant growth stage and infection or infestation using crops and pest species of economic importance. However, they are time-and-space consuming and labor intensive. Furthermore the conventional spray application technology used requires much greater amounts of the test substance (typically 10–60 mg of chemical compounds) than is actually applied to the surface of the soil or plant because of losses. These losses arise from both the dead volume in the applicator and from spray entrained in the air space or overspray reaching the walls of the spray chamber rather than reaching the test unit The requirement for this amount of test substance places constraints on the synthesis or. acquisition of compounds to be tested. This requirement is becoming more difficult to satisfy as modern synthetic methods such as combinatorial chemistry increasingly make very large numbers of chemical analogs available but only in very limited quantities (often less than a milligram each).

An alternative to such large scale testing is the use of in vitro assays or miniaturized in vivo assays. In vitro assays typically assay the affect of a test compound on one or more specific target enzymes or binding proteins, while miniaturized in vivo assays utilize surrogate indicator species (such as *Arabadopsis thaliana* or yeast) which can be grown in microtiter plates. These assays have the capability of testing very large numbers of compounds using microgram quantities of test compounds such as are produced by combinatorial or other automated synthetic methods. The disadvantage of these assays is that results on isolated enzyme target sites or surrogate indicator species often do not translate to more realistic, macro-level insecticide, fungicide or herbicide assays on the actual pest species and crops of interest.

For the objective of crop protection chemical discovery, in vitro assays and miniaturized in vivo assays produce both false positive and negative results.

Thus a means of efficiently applying small amounts such as microgram quantities of test substances to test units (e.g., organisms of agronomic importance) is needed. Furthermore the ideal application method would deliver the test substance as a spray rather than a drench, dip or other method not readily useful for commercial application. The present invention provides an apparatus and method satisfying this need.

SUMMARY OF THE INVENTION

This invention pertains to an apparatus for applying a test substance to a test unit, the apparatus comprising:

(a) an atomizer for producing droplets from a solution or suspension containing the test substance; and (b) a means for electrostatically charging the test unit with charges opposite to that on the droplets to attract the droplets to the test unit.

The apparatus may further comprise an optional gas-assist device to move the atomized droplets towards the test unit.

This invention also pertains to a method for applying a test substance to a test unit, the method comprising:

(a) atomizing a solution or suspension containing the test substance into droplets; and (b) electrostatically charging the test unit with charges opposite to that on the droplets to attract the droplets to the test unit.

The method may further comprise moving the atomized droplets towards the test unit by use of a gas-assist device.

BRIEF DESCRIPTION OF THE FIGURES

Embodiments of the invention can be more fully understood upon having reference to the accompanying drawings described as follows.

DETAILED DESCRIPTION OF THE INVENTION

Figure 1:
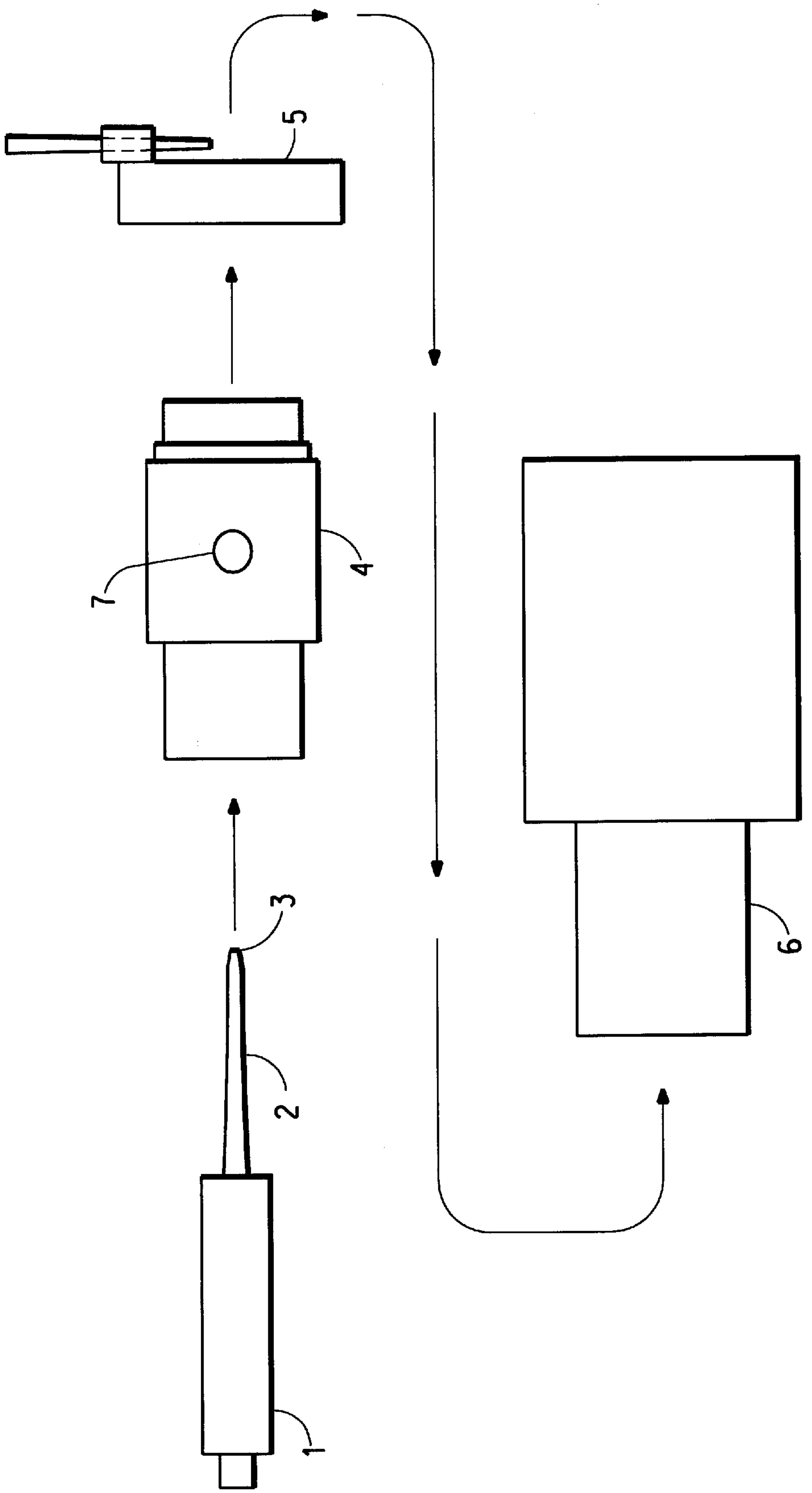
FIG. 1 is an illustration of an unassembled nozzle assembly comprising an ultrasonic nebulizer, air mover, pipette jig and nozzle body.

This invention pertains to an apparatus and method for the spray application of a small quantity of a test substance to a test unit. Although quantities greater than 1 mg can be applied by this invention, the excellent application efficiency afforded by this invention makes it particularly valuable for smaller samples of test substances. Such small quantities of a test substance being assayed for agronomic utility can exhibit a measurable effect on an organism such as a plant or insect as the test unit if the test substance can be applied to the organism without significant loss. The present invention provides such application efficiency.

A test substance evaluated for agronomic utility as a crop protection agent (e.g., insecticide, fungicide or herbicide) is generally a chemical compound or mixture of chemical compounds. However, the test substance can also be an organism (e.g., virus, bacterium, fungus) potentially capable of attacking the target pest.

As most substances of interest for testing are not low-to-moderate viscosity liquids, before being atomized into droplets they need to be first dissolved or suspended in a suitable solvent or mixture of solvents. The solvent is selected based on the physical properties of the substance to give preferably a solution. Suspensions can also be used if the test substance is composed of particles smaller than the atomized droplet size. Suspended test substances can include chemical compounds or microorganisms such as viruses, bacteria or fungal spores. For assaying agronomic utility as a crop protection agent, it is also important that the solvent itself have little biological effect. A wide range of solvents can be used alone or in mixture. Typical solvents include water, acetone, methyl ethyl ketone, methanol, ethanol, isopropanol, methyl sulfoxide and 1-methyl-2-pyrrolidone. The solvent can also contain an ionic or nonionic surfactant, which facilitates adhesion to the surface of the test organism.

In the method and apparatus of the present invention the solution or suspension of the test substance is atomized to finely dispersed droplets that are electrostatically attracted to the test unit. For good dispersion and attraction to the test unit, droplets having diameters in the range of about 20 $\mu$m to about 500 $\mu$m are most suitable. Droplets or particles having diameters in the range of about 40 $\mu$m to about 100 $\mu$m provide optimal coverage of test units comprising plant foliage. Although a variety of established technologies, including fluid nozzle, rotary disk, piezoelectric and electrostatic techniques, can be used in the atomizer to produce the requisite fine droplets, an ultrasonic nebulizer (using ultrasonic energy) is particularly useful as an atomizer for small test samples. Ultrasonic nebulizers use a horn vibrated at ultrasonic frequencies to emit droplets. Ultrasonic nebulizers produce very small droplets with high efficiency and modest dead volumes, allowing atomizing microliter volumes. Commercially available nebulizers allow introducing the solution or suspension of the test substance through a central bore in the ultrasonic hom. Pumping devices such as a syringe pump can be used to aspirate and dispense the solution or suspension through the central bore. Alternatively to further reduce the dead volume, the solution or suspension of the test substance can be applied directly to the tip of the energized ultrasonic horn using a positive displacement liquid handling device, such as a pipette: dispenser or other means. The atomizer can be placed above the test unit, to the side of the test unit or any position in-between. The atomizer is generally directed towards the test unit.

The mist of test-sample-containing droplets generated by the atomizer can then be moved towards the test unit by a gas-assist device. In the phrase "gas-assist", the term "gas" embraces both air and separated gases, for example, nitrogen, carbon dioxide, argon, oxygen and helium. Many of these gases are available commercially in purified form stored in compressed gas cylinders or liquefied in cryogenic containers. The gas-assist device provides a stream of gas that entrains the atomized droplets containing the test substance and moves them towards the test unit. Preferably the flow of gas is adjusted to move the mist of droplets from the atomizer to the air space surrounding the test unit. The gas assist is not a critical element for the function of this invention, but is beneficial particularly when the atomizer is placed to the side rather than above the test unit or when the atomizer itself produces little spray velocity, as is typical for an ultrasonic nebulizer. Preferably to minimize influences on electrostatic fields the gas assist device is constructed of a nonconductive material such as a non-conductive polymer, e.g., Teflon® fluorocarbon polymer. The gas-assist device can be combined with the atomizer into a physically integrated unit.

Enclosing the test unit in a test chamber minimizes air turbulence that could interfere with spray application process. For testing substances for biological activity, enclosing the test unit is particularly desirable to protect the operator and external environment from exposure to the test substance. To minimize influences on electrostatic fields the test chamber is preferably made of a non-conductive material such as a plastic polymer. The atomizer and optional gas-assist device are typically attached to the test chamber, and located either in the interior of the test chamber or on the exterior adjacent to an opening allowing passage of the test-substance-containing droplets into the test chamber.

To attract the droplets containing the test substance to the test unit, the test unit is electrostatically charged with charges opposite to that on the droplets. An applied voltage of about 1 kV or greater provides sufficient electrostatic charge to significantly attract atomized droplets. Although voltages greater than about 30 kV can be used providing they do not cause arcing, no more than about 30 kV is needed. For most configurations of atomizer and test unit, a voltage in the range of about 5 kV to about 10 kV very efficiently attracts droplets onto the test unit. Any means to apply voltage and impart electrostatic charge can be used. A high voltage power supply is convenient for this purpose.

For electrostatic attraction, the test unit must be charged oppositely to the droplets, which bear the same charge as the atomizer. The electrostatic attraction can be achieved by charging the test unit positively or negatively versus the environment including the atomizer or by charging the atomizer positively or negatively versus the environment including the test unit. Although the latter charging configuration is employed in electrostatic application of crop protection chemicals to fields and orchards on farms, in the present invention charging the test unit instead of the atomizer relative to the environment gives greater. application efficiency. Charging the test unit relative to the environment (i.e., "ground") maximizes attraction of the droplets to the test unit and minimizes their loss to other parts of the test system, such as the walls of the test chamber. In this configuration, the droplets are at ground potential, like other parts of the test system except for the test unit and connecting electrodes.

To impart charge to the test unit or the atomizer one pole of the electrostatic charger (e.g., power supply) is connected to the test unit or the atomizer while the other pole is connected to ground. To conveniently charge a plant in a growing medium as the test unit an electrode connected to the charger can be inserted into the growing medium. Any growing medium with sufficient moisture to support plant growth will be suitable for conducting charge to the plant and any insects or fungi on it. The growing medium can be soil composed of various amounts of sand, silt, clay and humus, or any of a variety of artificial media including rock wool, fiberglass, vermiculite, perlite, peat moss, bark, shredded coconut husks, etc.

If the test unit is charged versus the environment, the test unit needs to be electrically insulated from the environment by suspending it or supporting it on a surface using non-conductive material such as glass or plastic polymer to insulate from ground. The test unit is electrically connected to the electrostatic charger. Instead of immovable support, the test unit can be supported on a rotatable platform, i.e., turntable, to allow rotating the test unit while the droplets containing the test substance are applied. The turntable is not a critical element of this invention, but is beneficial for facilitating even distribution of the test substance on the test unit, particularly when the atomizer is positioned to the side of the test unit. When a turntable is used, it preferably is mainly composed of a non-conductive material such as glass or a plastic polymer to minimize influences on electrostatic fields. Preferably a charging electrode is mounted on the upper surface of the turntable to make contact with the test unit. Alternatively, an electrode positioned along the vertical axis of the turntable can contact the test unit from above the test unit.

For evaluation of fungicidal effect, the test substance is generally first applied to the foliage of the plant comprising the test unit using the apparatus and method of this invention before the foliage is inoculated with fungal spores or otherwise infected with fungus. Alternatively, the foliage can be treated with the test substance after inoculating with the fungus, and indeed the apparatus and method of this invention can be used to apply pathogenic as well as nonpathogenic fungal spores. For evaluation of arthropodicidal effect, the foliage of the plant comprising the test unit is generally first infested with an arthropod pest (e.g., insect or mite) before applying the test substance using the apparatus and method of this invention. Alternatively, the arthropod pest can be added after application of the test substance. Furthermore, a test substance can be applied using the apparatus and method of this invention to an arthropod pest as the test unit in the absence of plant foliage.

Without further elaboration, it is believed that one skilled in the art using the preceding description can utilize the present invention to its fullest extent to efficiently apply even small amounts of a test substance to a test unit. The following specific exemplary embodiments are, therefore, to be construed as merely illustrative, and not limiting of the disclosure in any way whatsoever.

DESCRIPTION OF ILLUSTRATIVE EMBODIMENTS

An example apparatus of the present invention for applying with high efficiency small quantities of experimental compounds in small volumes of atomized solution to test units, such as whole plants, comprises:

(a) an ultrasonic nebulizer for atomizing microliter volumes of test substance, (b) a positive displacement liquid handling device, such as a pipette, for aspirating and dispensing test substance solutions, (c) a jig for positioning the liquid handling device relative to the ultrasonic nebulizer, (d) a gas-assist device for conveying an atomized test substance towards a test unit, (e) a high voltage power supply used for generating an electrostatic field force between the test unit and the atomized test substance, (f) a rotatable test platform for test unit support through which high voltage is applied to the test unit, (g) a test chamber with safety interlocks for housing the apparatus, protecting the operator, and eliminating air turbulence during spray operations, allowing operation in a larger ventilated enclosure, and (h) a control system for automating a defined sequence of operational steps.

Figure 2:
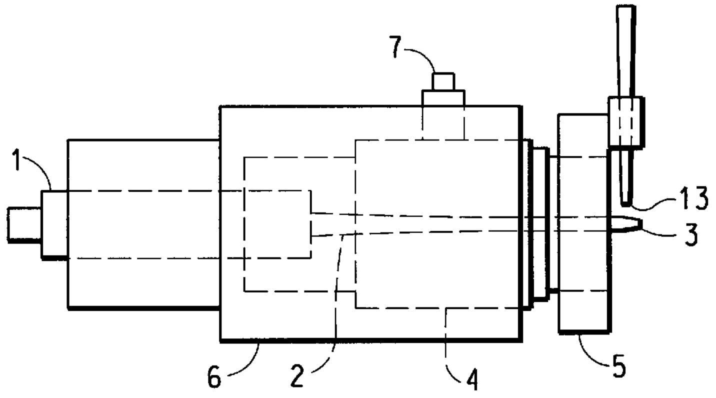
FIG. 2 is an illustration of the assembled nozzle assembly comprised as above.

FIG. 1 and FIG. 2, respectively, illustrate the unassembled and assembled spray nozzle assembly comprised of an ultrasonic nebulizer (1), a gas-assist device (4) and a jig (5).

In the present example, the ultrasonic nebulizer (1) is a 40 kHz generator-driven MICROMIST™ model number XL6040 having a modified horn. Unlike the standard commercially available horn, which has probe containing a central bore through which the liquid sample can be aspirated and dispensed, the probe of the modified horn (2) of the ultrasonic nebulizer is made of solid construction (no central bore) and has a tapered probe tip (3) to produce a conical spray pattern.

The gas-assist device (4), a Nortel Airmover Model No. AM750 manufactured by Nortel Machinery, Inc., is used to convey atomized test substances to the test unit. The gas-assist device is supplied with a compressed air input (7) that provides air through an adjustable annular orifice releasing a large volume air output relative to the compressed air input. With appropriate positioning (refer to assembled nozzle body, FIG. 2) atomized samples are entrained in the large volume air output and conveyed to the air space surrounding the test sample.

In this example, the jig (5) is mounted on the front of the gas assist device to position the pipette tip (13) of an Eppendorf EDOS 5222 electronic pipette dispenser as the liquid handling device in close proximity to the ultrasonic horn tip. The jig is constructed of nonconductive fluorocarbon polymer to minimize influences on electrostatic fields.

A nozzle housing (6) constructed of non-conductive polymer is used to join the individual components of the nozzle assembly.

Figure 3:
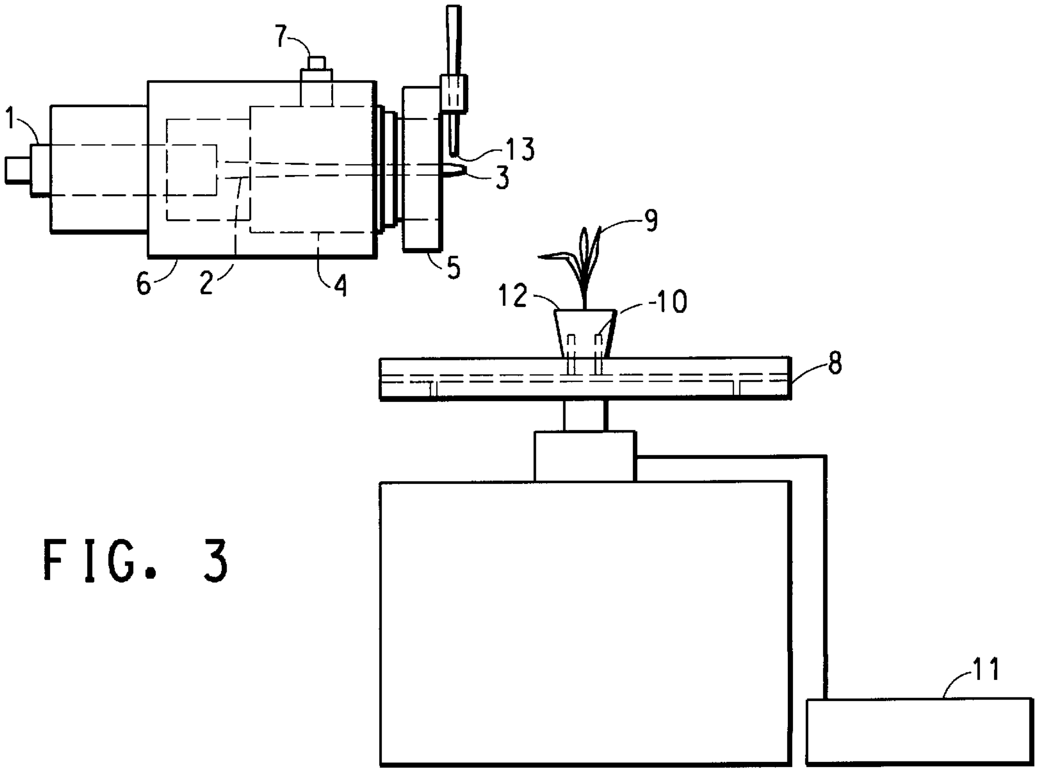
FIG. 3 is an illustration of the assembled nozzle assembly with platform and high voltage power supply for generating an electrostatic field.

As illustrated in FIG. 3, a rotatable platform (8) presents the test unit relative to the nozzle assembly. The platform has electrodes through which a 5 kV to 10 kV potential from a Spellman Corp. Model No. SL30PN30 high voltage power supply (11) is applied to the test unit. When the electrode is energized and the nozzle assembly is appropriately grounded, an electrostatic field is generated. The positive charge on the test unit creates an electromagnetic field that causes the atomized test substance at ground potential to be deposited on the test unit with great efficiency. This results in superior spray deposition and distribution on all test unit surfaces of even small amounts of test substances in small spray volumes.

In this example, a typical test unit consists of a plant (9) (crop or weed species) grown in a plastic container (12) (approx. dimensions 2.5 cm×2.5 cm×5 cm tall) to an appropriate growth stage (typically 6–8 days). The bottom of the container has four drain holes to allow drainage. The holes are also used to position the platform electrodes (10) in the container.

Figure 4:
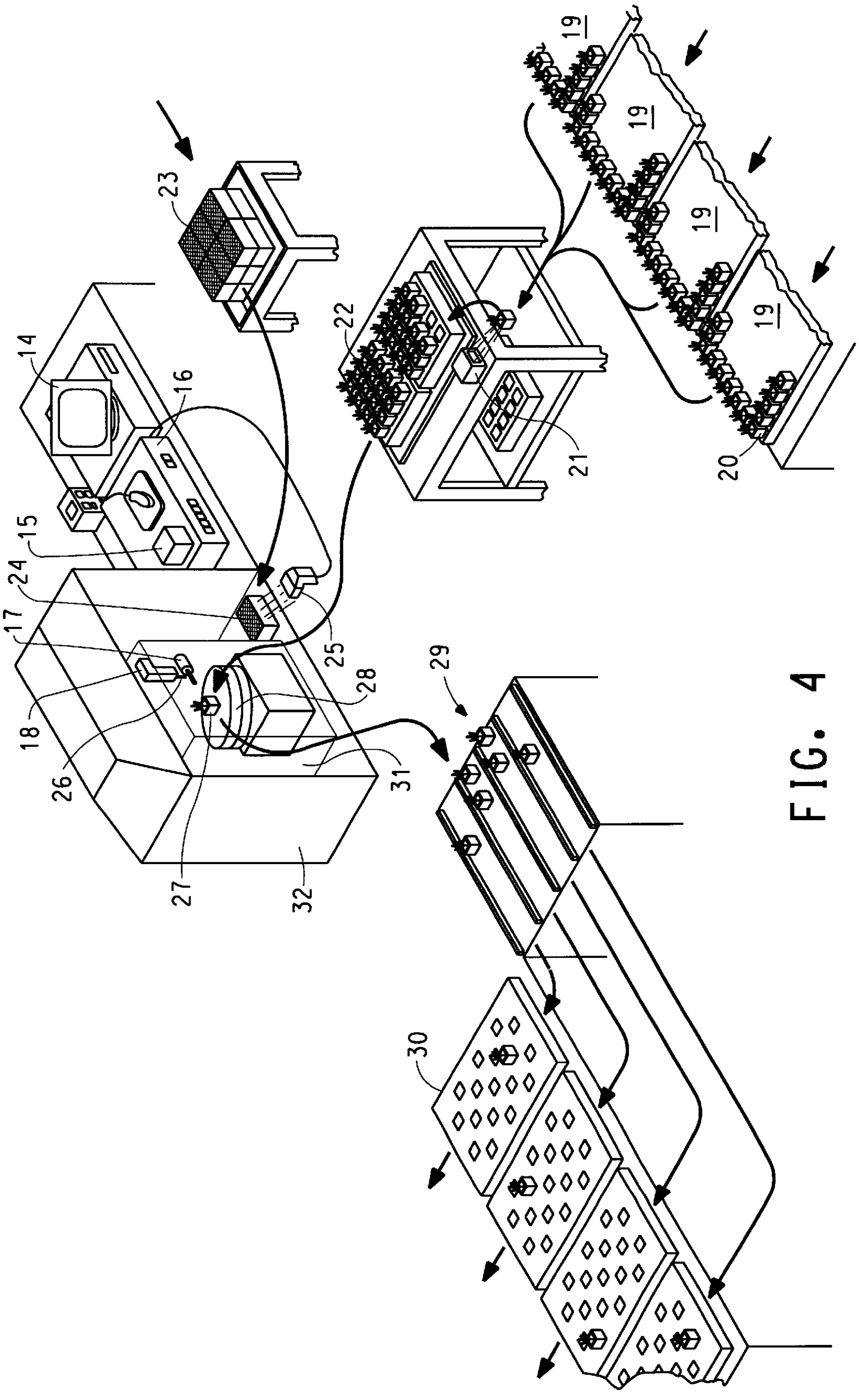
FIG. 4 is an illustration depicting the process flow for a sprayer apparatus.

As illustrated in FIG. 4, the nozzle assembly and platform are housed in a chamber (31) made of non-conductive material and equipped with safety interlocks. The chamber (31) is housed in a ventilated enclosure such as a laboratory hood (32) to further protect the operator.

A master control panel (not shown) with an internal Program Logic Controller (PLC) is used to automated a sequence of steps to accommodate test treatments.

Operation

FIG. 4 illustrates a process for evaluating test substances on test units according to this example. To operate the system, the master control panel (14) is energized and individual components such as the ultrasonic generator (15), the high voltage power supply (16), the air mover (17) and the EDOS dispenser (18) are configured to appropriate settings. In a typical run, the amplitude control knob of the 40 kHz generator-driven MICROMIST™ model XL6040 ultrasonic generator is set to 6, the high voltage power supply is set between 5 and 10 kV to provide an observed current of 0.15 mA, the Nortel Model AM750 Airmover is set to provide a flow gauge reading of 30 (corresponding to an air flow of 10,000 mL/minute), and the EDOS dispenser with a 500 $\mu$L pipette tip is set to Single Dispense Mode, 125 $\mu$L Dispense Volume, Repeats=4, Aspirate Speed=8 and Dispense Speed =3. Optimal settings may vary depending upon the particular application configuration, but can be easily determined by one skilled in the art.

In this example, test units are received in containers (19) prior to a sorting process step. Each container contains like test units (20) (e.g., same biological species). One test unit from each like container is selected, a barcode (21) is attached, and the test unit is placed in an array of unlike test units (22) (e.g., different biological species). The resulting arrays of unlike test units are organized so that each individual unlike test unit within an array shares the same barcode designation. This facilitates applying the treatment (spray application) of a given test substance to all test units sharing the same barcode designation. In this example, test units are sorted manually. However, a conveyance system utilizing a conveyor belt or the like can be beneficially used to automate the sorting process.

In this example, solutions or suspensions of test substances are contained within vessels in the form of microtiter plate vials (23) held within a microtiter plate (24). A barcode on the microtiter plate is read (25) to allow for tracking and matching test substances to the corresponding arrays of unlike test units. Each vial contains enough volume (500 $\mu$L) to accommodate four individual treatments (125 $\mu$L each) on four individual unlike test units within an array. The test substance is manually aspirated into a 500 $\mu$L pipette tip using the Eppendorf EDOS 5222 system (18). The pipette tip (13, 26) is then placed in the nozzle assembly jig for positioning in close proximity above the ultrasonic horn tip. Although in this example the test substances are manipulated by hand, conveyance systems and robotics can be beneficially used to automate test substance handling.

The test substance is then ready to be applied to an array of individual unlike test units. In this example, one unlike test unit (27) from a given array is placed on the platform (8, 28). (Alternatively, multiple unlike test units from an array can be placed in the platform for simultaneous treatment) The enclosure door is closed, and a switch is engaged which prompts the PLC to begin a sequence of steps that complete the spray application. The automated sequence of steps typically includes, in order, the following:

(1) engaging safety interlocks, (2) energizing the ultrasonic probe, (3) supplying voltage from the power supply to the test unit, (4) initiating platform rotation, (5) pipette dispensing, (6) ceasing platform rotation, (7) dissipating voltage from the test unit, (8) de-energizing the ultrasonic probe, and (9) disengaging the safety interlocks, where steps 2, 3, and 4 are carried out concurrently and steps 6, 7, and 8 are carried out concurrently.

The operator then removes the unlike test unit to the receiving area (29) where like test units are placed in the same container (30) for transfer to greenhouses or growth chambers prior to rating the treatment results. The next unlike test unit from the array (22) is placed on the platform (8, 28), and the sequence continues until all unlike test units from a given array are treated. The cycle is then repeated for the next test substance and corresponding array of unlike test units.

What is claimed is:

1. An apparatus for applying a test substance to a test unit, the apparatus comprising:

(a) a nebulizer for emitting droplets from a solution or suspension containing the test substance from a tip of an ultrasonic horn, which the nebulizer is connected to ground;

(b) a high voltage power supply connected to the test unit to electrostatically charge the test unit to attract the droplets to the test unit; and (c) a positive displacement liquid handling device for delivering the solution or suspension to the tip of the ultrasonic horn of the nebulizer.

2. The apparatus of claim 1 further comprising a gas-assist device to move the atomized droplets towards the test unit.

3. The apparatus according to claim 1 further comprising a turntable supporting the test unit.

4. A method for applying a test substance to a test unit, the method comprising:

(a) atomizing into droplets a solution or suspension containing the test substance by use of a nebulizer which is connected to ground and which emits droplets from a tip of an ultrasonic horn;

(b) connecting a high voltage power supply to the test unit to charge the test unit to attract the droplets to the test unit; and (c) delivering the solution or suspension to the tip of the ultrasonic horn using a positive displacement liquid handling device.

5. The method of claim 4 further comprising moving the atomized droplets towards the test unit by use of a gas-assist device.

6. The method according to claim 4 wherein the test unit is rotated on a turntable while the test substance is applied.

7. The method according to any one of claims 4, 5, or 6 wherein the test unit comprises a plant.

8. The method according to claim 7 wherein the plant has been inoculated or infected with a fungus.

9. The method according to any one of claims 4, 5, or 6 wherein the test unit comprises an arthropod pest.

* * * * *